United States Patent [19]

Amano et al.

[11] Patent Number: 5,064,917

[45] Date of Patent: Nov. 12, 1991

[54] PROCESS OF POLYMERIZING VINYL CHLORIDE WITH WASHING OF CHARGING PASSAGE

[75] Inventors: Tadashi Amano; Shigehiro Hoshida, both of Ibaraki, Japan

[73] Assignee: Shin-Etsu Chemical Co., Ltd., Tokyo, Japan

[21] Appl. No.: 462,972

[22] Filed: Jan. 5, 1990

Related U.S. Application Data

[63] Continuation-in-part of Ser. No. 293,994, Jan. 6, 1989, abandoned.

[30] Foreign Application Priority Data

Jan. 8, 1988 [JP] Japan .................................... 63-2346
Jun. 2, 1988 [JP] Japan ................................ 63-136224

[51] Int. Cl.$^5$ ............................................... C08F 2/20
[52] U.S. Cl. ....................................... 526/72; 526/74; 526/200
[58] Field of Search ................... 526/62, 74, 72, 344.2

[56] References Cited

U.S. PATENT DOCUMENTS 4,320,215 3/1982 Yonezawa .............................. 526/62
4,661,569 4/1987 Kleine ................................... 526/62

*Primary Examiner*—Christopher Henderson
*Attorney, Agent, or Firm*—Oblon, Spivak, McClelland, Maier & Neustadt

[57] ABSTRACT

A process of preparing a vinyl chloride polymer in a polymerization vessel comprising the steps of:
 charging a polymerization initiator through a charging passage communicating with the inside of the polymerization vessel, and
 polymerizing vinyl chloride or a vinyl monomer mixture containing vinyl chloride in an aqueous medium,
 wherein after said polymerization initiator has been charged into the polymerization vessel, said charging passage is washed with a cleaning fluid containing a polymerization inhibitor. This process can effectively prevent scale formation in the charging passage and produce a vinyl chloride polymer of high quality.

10 Claims, No Drawings

PROCESS OF POLYMERIZING VINYL CHLORIDE WITH WASHING OF CHARGING PASSAGE

This is a continuation-in-part application of Ser. No. 07/293,994 filed on Jan. 6, 1989, now abandoned.

BACKGROUND OF THE INVENTION

1. Field of the Invention

This invention relates to a process of preparing a vinyl chloride polymer, and more particularly to a process of preparing vinyl chloride polymer, that can prepare a vinyl chloride polymer of high quality with a high productivity.

2. Description of the Prior Art

In preparing vinyl chloride polymers, it may sometimes occur that, after a polymerization initiator has been fed into a polymerization vessel through a charging passage comprising a charging pipe, etc., the polymerization initiator sticks on the inner wall of the charging passage, particularly at a charge port positioned at the end of the charging passage to remain there. The polymerization initiator remaining like this reacts with a monomer during the polymerization, resulting in formation of polymer scale. Since the polymer scale may grow to clog the charging passage, particularly at the charge port, the grown polymer scale must be removed.

As methods of removing the polymerization initiator having stuck and remaining in the charging passage and of preventing formation of the polymer scale, proposed are a method in which the charging passage is washed with an organic solvent, a method in which the charge port is closed to block the invasion of the monomer from the inside of the polymerization vessel, etc.

However, in the former method, in which the charging passage is washed with an organic solvent, a large quantity of the organic solvent is required for completely removing the polymerization initiator having stuck and remaining therein, so that the solvent remains in a manufactured polymer to cause a lowering of quality, and generation of an ill smell when the polymer is molded or formed. Hence, there is a limit on the amount of the organic solvent to be used, and thus the washing can not be thoroughly performed. As the results, the polymerization initiator remains more or less, bringing about the problem that the polymer scale are still formed if the polymerization is carried out for a long period of time. In the latter method, in which the charge port is closed, there has been the problem that the monomer invades into the charging passage from a gap in the closed charge port resulting in the formation of polymer scale.

There has been also proposed a method in which the polymerization initiator is charged as an aqueous emulsion in order to reduce the amount of an organic solvent to be used. This method can make it avoidable that the organic solvent remains in a manufactured polymer, but yet it is difficult to prevent the polymerization initiator from sticking and remaining in the charging passage, and to prevent the scale formation in the charging passage.

Yonezawa et al. discloses in the U.S. Pat. No. 4,320,215, a method of polymerizing vinyl chloride monomer, wherein a coating agent capable of inhibiting radical polymerization is coated on the inner surfaces of the polymerization vessel and associated equipment used in the polymerization of vinyl chloride monomer, to prevent polymer scale formation and adhesion. The associated equipment is exemplified by propellers and agitators. (See column 4, lines 20-21).

Kleine et al. discloses in the U.S. Pat. No. 4,661,569 discloses a process of polymerizing ethylenically unsaturated monomers including vinyl chloride in the presence of a free radical-forming initiator in a reactor, wherein the surfaces of the reaction container wall and other equipment including pipelines are coated with a particular compound.

According to the method or the process disclosed in the above patents, the coating formed on the surfaces of a polymerization vessel, etc. needs to be insoluble in vinyl chloride monomer and aqueous medium (See column 2, lines 45-49 in the U.S. Pat. No. 4,320,215; and column 2, lines 45-51 and column 8, lines 16-21 in the U.S. Pat. No. 4,661,569), because it is required to enhance the durability of the coating and its scale preventing action, and it is also required to prevent product polymer or waste water from being contaminated with the material of the coating. Therefore, the method or the process is suitable for preventing polymer scale formation on the inner wall of a polymerization vessel and on the surfaces of equipment such as propellers, agitators and baffles used in the polymerization vessel. However, the method or process is not effective in preventing scale formation in passages for charging polymerization initiators for the following reason. After a polymerization initiator solution is charged in a polymerization through a charging passage, part of the solution containing the polymerization initiator remains in the passage and stays in various depressions or just above valves provided in vertical portions of the passage. Since the coating dissolves in the standing solution with difficulty, the standing solution containing the polymerization initiator is contact with the coating formed on the inner surfaces of the passage only at the surface of the coating. In other words, the mass of the standing solution are not in contact with the coating; most of the polymerization initiator remains active. Thus, if vinyl chloride monomer gas leaks via a valve from the inside of a polymerization vessel into the passage, the monomer is polymerized by the polymerization initiator contained in the standing solution.

SUMMARY OF THE INVENTION

Accordingly, an object of this invention is to provide a process of preparing a vinyl chloride polymer, that can remove effectively, and yet with a small amount or organic solvent, the polymerization initiator having stuck and remaining on the charging passage, thereby not only making it possible to effectively prevent the formation of polymer scale but also making it possible to decrease the organic solvent remaining in the resulting polymer and obtain a manufactured polymer of high quality.

As a means for solving the above problems, this invention provides a process of preparing a vinyl chloride polymer in a polymerization vessel comprising the steps of:

charging an oil-soluble polymerization initiator through a charging passage communicating with the inside of the polymerization vessel, and polymerizing vinyl choride or a vinyl monomer mixture containing vinyl chloride in an aqueous medium, wherein after said oil-soluble polymerization initiator has been charged into the polymerization vessel, said charging passage is washed with a cleaning fluid containing a vinyl chloride-soluble polymerization inhibitor in an organic solvent.

The process of preparing vinyl chloride polymers according to this invention can remove the polymerization initiator sticking and remaining on the charging passage more effectively and yet with a smaller amount of organic solvent than the conventional methods. Hence, the process can effectively prevent formation of polymer scale requiring no operation for removing polymer scale, and thus enabling preparation of vinyl chloride polymers with a high productivity. Moreover, the amount of the solvent remaining in the manufactured polymer can be made so small that vinyl chloride polymers of high quality can be obtained.

DETAILED DESCRIPTION OF THE PREFERRED EMBODIMENTS OF THE INVENTION

According to the process of this invention, a charging passage used for the charging of a polymerization initiator is washed with the cleaning fluid. The charging passage to be used is not required to be the one specially prepared for charging the polymerization initiator. For instance, where a charging passage prepared for charging a polymerization medium such as water, has been used for charging a polymerization initiator, this charging passage used must be washed with the cleaning fluid.

In the process of this invention, there is no particular limitation on the form of the charging passage to be washed. However, the charging passage usually comprises a pipe connected with the polymerization vessel, and it has a port at its end (herein, called "charging port") which opens in the inside of the polymerization vessel. There is no limitation on the form of the charging port. For example, the charging port may be able to be opened and closed with a valve.

The cleaning fluid used in this invention contains a vinyl chloride-soluble polymerization inhibitor in an organic solvent. Here, there are no limitations on the organic solvent used for the cleaning fluid; commonly available organic solvents may be used. For example, it may include aliphatic hydrocarbons such as n-hexane, n-heptane and isooctane, aromatic hydrocarbons such as benzene, toluene, xylene, and ethylbenzene, alcohols such as methanol, ethanol and 2-propanol, halogenated hydrocarbons such as methyl chloride, methylene chloride and chloroform, ethers such as ethyl ether and dichloroethyl ether, ketones such as acetone, methyl acetone and methyl ethyl ketone, esters such as methyl formate, methyl acetate, n-butyl acetate and ethyl formate, and derivatives of these. These can be used either alone or in combination.

Preferred are the organic solvents in which the oil-soluble polymerization initiator charged into the polymerization vessel can readily dissolve, because the oil-soluble polymerization initiator sticking and remaining in the charging passage can be removed more effectively. Such solvents in which a polymerization initiator can readily dissolve, include, for example, isoparaffins having 5 to 30 carbon atoms and toluene. The isoparaffins are available, for example, under the tradename, Shellsol 71 (supplied by Shell). These solvents are usually used as a solvent for charging the oil-soluble polymerization initiator.

The organic solvents in which the oil-soluble polymerization initiator can readily dissolve may be used singly or in combination with other organic solvents, exemplified above. Among the other solvents, preferred are alcohols such as ethanol and 2-propanol, because these remain in a manufactured polymer in a small amount and produce waste water that can be effectively treated. Preferably, the mixed solvent contains 50% by weight or more, particularly 80% by weight or more of the organic solvent in which the oil-soluble polymerization initiator can readily dissolve.

The polymerization inhibitors used in this invention are limited to those soluble in vinyl chloride. The vinyl chloride-soluble polymerization inhibitors include, for example, phenol compounds such as 2,2-di(4'-hydroxyphenyl)propane, hydroquinone, p-methoxyphenol, t-butylhydroxyanisole, n-octadecyl-3-(4-hydroxy-3,5-di-t-butylphenyl)propionate, 2,5-di-t-butylhydroquinone, 4,4'-butylidene-bis(3-methyl-6-t-butylphenol, 3,5-di-t-butyl-4-hydroxytoluene, 2,2'-methylene-bis(4-ethyl-6-t-butylphenol), triethylene glycol-bis[3-(3-t-butyl-5-methyl-4-hydroxyphenyl)propionate], pentaerythrityl tetrakis[3-(3,5-di-t-butyl-4-hydroxyphenyl)propionate], t-butylcatechol, 4,4'-thiobis(6-t-butyl-m-cresole), tocopherol, and nordihydroguaiaretic acid; amine compounds such as phenylnaphthylamine, N,N'-diphenyl-p-phenylenediamine, 4,4-bis(dimethylbenzyl)diphenylamine, semicarbazide, derivatives of semicarbazide such as a hydrofluoride, hydrochloride, nitrate, acidic sulfate, sulfate, chlorate, formate, acidic oxalate, acidic maleate or maleate of semicarbazide, 1-acetylsemicarbazide, 1-chloroacetylsemicarbazide, 1-dichloroacetylsemicarbazide, 1-benzolysemicarbazide and semicarbazone, carbohydrazide, thiosemicarbazide, thiosemicarbazone, and derivatives of these, thiocarbazide, thiocarbazide, and derivatives of these; phosphoric compounds such as triphenylphosphite, diphenylisodecylphosphite, phenyldiisodecylphosphite, 4,4'-butylidene-bis(3-methyl-6-t-butylphenyl-di-tridecyl)phosphite, cyclic neopentanetetraylbis(octadecylphosphite), tris(nonylphenyl)phosphite, and tris(dinonylphenyl)phosphite; unsaturated hydrocarbon compounds such as styrene, 1,3-hexadiene, and methylstyrene; and thio compounds such as dilauryl thiodipropionate, dimyristyl thiodipropionate, distearyl thiodipropionate, dodecylmercaptan, and 1,3-diphenyl-2-thiourea. Among these, preferred are t-butylhydroxylanisole and di-t-butylhydroquinone, because the initial color of the manufactured polymer and polymer scale formation preventing effect are improved. The above polymerization inhibitors can be used either alone or in combination.

There are no limitations on the concentration of the vinyl chloride-soluble polymerization inhibitor. The polymerization inhibitor may usually be contained in a concentration of from 0.001 to 90% by weight in the cleaning fluid. If the concentration of the polymerization inhibitor in the cleaning fluid is too low, it is difficult to suppress the action of the polymerization initiator remaining in the charging passage; thereby the formation of polymer scale may occur. If the concentration is too high, retardation of the polymerization may occur.

After the charging passage is washed with the cleaning fluid, part of the polymerization inhibitor remains in the charging passage. Where vinyl chloride monomer leaks from the inside of the polymerization vessel into the charging passage, it will come to contact with the polymerization inhibitor. Even if a trace of polymerization initiator remains in the charging passage, and free radical forming reaction may be caused thereby, the free radicals formed from vinyl chloride is deactivated by the polymerization inhibitor quickly, because the polymerization inhibitor is vinyl chloride-soluble and therefore intimate with vinyl chloride.

The cleaning fluid containing the above vinyl chloride-soluble polymerization inhibitor may be used in an amount with which the whole inner surfaces of the charging passage comprising the pipe and charge port can be washed. The polymerization initiator remaining in the charging passage can be removed with a very smaller amount of the cleaning fluid than the amount required in the case where washing is carried out with a solvent only.

Further, the cleaning fluid is preferably used in such an amount that the total amount of the polymerization inhibitor contained in the whole cleaning fluid used for washing may be 1% by weight or less based on the total amount of vinyl monomers charged.

Preferably, the cleaning fluid containing the polymerization inhibitor is used at a temperature of from $-50°$ C. to the boiling point of the solvent used for the cleaning fluid. More preferably, it is used at a temperature at which the polymerization initiator has a half-life period of 1 hour or less.

For the cleaning fluid used in the invention, the vinyl chloride-soluble polymerization inhibitor is preferably used in combination with an organic solvent in which the oil-soluble polymerization initiator can readily dissolve. Typical examples of such a combination of a polymerization inhibitor and a solvent include an isoparaffin and t-butylhydroxyanisole or di-t-butylhydroquinone; toluene and hydroquinone; methanol and 2,2'-di(4'-hydroxyphenyl)propane; n-hexane and 3-t-butyl-4-hydroxyanisole; a mixed solvent of an isoparaffin and toluene, and t-butylhydroxyanisole; a mixed solvent of an isoparaffin and ethanol and t-butylhydroxyanisole, and a mixed solvent of toluene and benzene and triphenyl phosphite. It is advantageous to use a cleaning fluid having a combination as exemplified above, because such a fluid exhibits good dispersibility, stability and storability.

The polymerization initiator used in the invention is limited to those oil-soluble. The oil-soluble polymerization initiators include, for example, percarbonate compounds such as diisopropyl peroxydicarbonate, di-2-ethylhexyl peroxydicarbonate, and diethoxyethyl peroxydicarbonate; perester compounds such as t-butyl peroxyneodecanoate, t-butyl peroxypivalate, t-hexyl peroxypivalate, and alpha-cumyl peroxyneodecanate; peroxides such as acetylcyclohexylsulfonyl peroxide, 2,4,4-trimethylpentyl 2-peroxyphenoxyacetate, and 3,5,5-trimethylhexanoyl peroxide; azo compounds such as azobis-2,4-dimethylvaleronitrile, and azobis(4-methoxy-2,4-dimethylvaleronitrile). These can be used either alone or in combination.

In the process of this invention, the polymerization initiator can be charged as it is, as a solution prepared by diluting it with a suitable organic solvent such as toluene or an isoparaffin, or as an aqueous emulsion prepared by using a dispersant. Charging the polymerization initiator as the aqueous emulsion has the advantage that the organic solvents entail can be obviated. The aqueous emulsion of the polymerization initiator is preferably used after its viscosity is adjusted so as to be easily handled for charging.

The dispersants which may be used for the above aqueous emulsion may be those conventionally used for suspension of emulsion polymerization of vinyl chloride, and include those as exemplified later.

Since the polymerization initiator is oil-soluble, it readily dissolves in the cleaning fluid containing an organic solvent, thereby being washed out.

The process of this invention can be applied to polymerization of any conventionally known vinyl chloride or vinyl monomer mixtures containing vinyl chloride. The form of polymerization is also not limited, including, for example, suspension polymerization and emulsion polymerization.

The vinyl monomers other than vinyl chloride may include, for example, alpha-olefins such as ethylene, propylene, 1-butene, 1-pentene, 1-hexene, 1-heptene, 1-octene, 1-nonene, 1-decene, 1-undecene, 1-dodecene, 1-tridecene and 1-tetradecene, acrylic acid and esters thereof, methacrylic acid and esters thereof, maleic acid and esters thereof, vinyl compounds such as vinyl acetate, vinyl propionate and alkyl vinyl ethers, maleic anhydride, acrylonitrile, styrene, vinylidene chloride, other monomers copolymerizable with vinyl chloride, and mixtures of any of these.

In instances in which a dispersant is used in the present polymerization, there are no particular limitations on the dispersant to be used, and those hitherto commonly used may be used. For example, it may include water-soluble cellulose ethers such as methyl cellulose, hydroxyethyl cellulose, hydroxypropyl cellulose, and hydroxypropylmethyl cellulose; water-soluble starch ethers partially saponified polyvinyl alcohol; acrylic acid polymers such as polyacrylic acid; water-soluble polymers such as gelatin; oil-soluble emulsifying agents such as sorbitan monolaurate, sorbitan trioleate, glycerol tristearate, and ethylene oxide propylene oxide block copolymers; and water-soluble emulsifying agents such as polyoxyethylene sorbitan monolaurate, polyoxyethylene glycerol oleate, and sodium laurate. These can be used either alone or in combination.

Other conditions in the polymerization according to the process of this invention, such as the manner by which the aqueous medium, vinyl chloride or other vinyl monomer, and dispersant are charged in the polymerization vessel, may be in the same manner as conventionally taken, and require no particular limitation. The same applies also to polymerization conditions such as charge proportion for these and polymerization temperature.

It is also optional to further add, if necessary, a polymerization regulator, a chain transfer agent, a pH adjustor, a gelation improver, an antistatic agent, an antiscale agent, etc. which are commonly used in preparing vinyl chloride polymers.

In the practice of the process of this invention, an aqueous medium, monomer, polymerization initiator and other necessary materials are charged into the polymerization vessel. There are no limitations on the order of charging of these materials. The polymerization initiator may be charged at any time, before and/or in the course of polymerization. It may also be charged continuously or intermittently in plural portions. It should be appreciated that, according the process of this invention, in any cases, the charging of the oil-soluble polymerization initiator must be followed by washing of the charging passage used with the cleaning fluid.

In the process of this invention, the polymerization is carried out at a temperature in the range of about 10° to 95° C., depending on the desired polymerization degree of the resulting polymer.

EXAMPLES

This invention will be described below in detail by way of non-limitative Examples and Comparative Examples.

EXAMPLES 1 TO 7, COMPARATIVE EXAMPLES 1 TO 8

In each example, 980 kg of deionized water, 382 g of partially saponified polyvinyl alcohol and 143 g of water-soluble methyl cellulose were charged in a polymerization vessel made of stainless steel and having an inner capacity of 2,000 liter, the inside of the polymerizatoon vessel was evacuated, and thereafter 700 kg of vinyl chloride was charged. Next, 280 g of di-2-ethylhexyl peroxydicarbonate was introduced into the polymerization vessel through a charging pipe (length: 3 m, inner diameter: 1 cm) having a charging port at its end positioned in the inside of the polymerization vessel, with use of a constant rate pump. Thereafter, the charging pipe was washed with a cleaning fluid. The solvent and the polymerization inhibitor used for the cleaning fluid, and the amount of the cleaning fluid used in each example are given in Table 1. (Provided no washing was carried out in Comparative Example 8).

With stirring the content of the polymerization vessel, temperature was raised to 57° C. to initiate polymerization, which was stopped when the inner pressure of the polymerization vessel fell to 6.0 kg/cm², and the unreacted monomer was recovered, followed by dehydration and drying to obtain a vinyl chloride polymer.

After the polymerization, the charging pipe and charge port of the polymerization vessel were taken apart to observe the state of the sticking of polymer scale on these parts, which was evaluated on the bases of the following criteria, and also the amount of the solvent remaining in the polymer obtained was measured according to the following method.

Evaluation Method for the State of the Sticking of Scale

A: No scale stuck.
B: Scale stuck slightly.
C: Scale stuck in a large quantity, having clogged the charge port.

Measurement Method for the Amount of Remaining Solvents

Into a vial, 5 g of the resulting polymer was put, and heat treatment was carried out at 130° C. for 30 minutes. A gaseous phase portion in the vial was analyzed by gas chromatography to indicate by ppm the amount measured for the remaining solvent.

Results obtained are shown in Table 1.

COMPARATIVE EXAMPLES 9 AND 10

The procedure of Example 1 was repeated to carry out polymerization, except that 400 ml of a solvent as shown in Table 1, containing no polymerization inhibitor, was used as the cleaning fluid. The state of the sticking of polymer scale was evaluated in the same manner. Results obtained are shown in Table 1.

TABLE 1

| | Cleaning fluid | | | | sticking state of scale | Amount of remaining solvent (ppm) |
|---|---|---|---|---|---|---|
| | Solvent | Polymerization inhibitor | Concentration of polymerization inhibitor (wt. %) | Amount of cleaning fluid (ml) | | |
| Example: | | | | | | |
| 1 | n-Hexane | 3-t-Butyl-4-hydroxyanisole | 0.1 | 500 | A | 10 |
| 2 | Methanol | Hydroquinone | 0.01 | 500 | A | 3 |
| 3 | Toluene | 3,5-Di-t-butyl 4-hydroxytoluene | 10 | 500 | A | 300 |
| 4 | Methyl ethyl ketone | 2,2'-di(4'-hydroxyphenyl) propane | 0.05 | 500 | A | 10 |
| 5 | Methyl ethyl ketone | 1,3-diphenyl-2-thiourea | 20 | 500 | A | 9 |
| 6 | Acetone | Triphenylphosphite | 50 | 500 | A | 13 |
| 7 | Benzene | Styrene | 0.001 | 1,000 | A | 450 |
| Comparative Example: | | | | | | |
| 1 | n-Hexane | — | — | 500 | C | 9 |
| 2 | Methanol | — | — | 500 | C | 2 |
| 3 | Toluene | — | — | 1,000 | B | 600 |
| 4 | Methyl ethyl ketone | — | — | 500 | B | 10 |
| 5 | Water | — | — | 500 | C | 0 |
| 6 | Acetone | — | — | 500 | C | 12 |
| 7 | Benzene | — | — | 1,000 | B | 500 |
| 8 | — | — | — | — | C | 0 |
| 9 | Toluene | — | — | 2,000 | B | 1,200 |
| 10 | Methyl ethyl ketone | — | — | 2,000 | B | 40 |

EXAMPLES 8 TO 13

In each Example, the procedure of Example 1 was repeated to carry out polymerization, except that 500 ml of methyl ethyl ketone solution containing 0.0005% by weight, 0.01% by weight, 0.1% by weight, 1% by weight or 17% by weight of di-t-butylhydroquinone was used as the cleaning fluid. After polymeriation, the state of the sticking of polymer scale was evaluated in the same manner as in Example 1. Results obtained are shown in Table 2.

TABLE 2

| Example No. | Concentration of polymerization inhibitor in cleaning fluid (% by weight) | Sticking state of scale |
| --- | --- | --- |
| 8 | 0.0005 | B |
| 9 | 0.01 | A |
| 10 | 0.1 | A |
| 11 | 1 | A |
| 12 | 10 | A |
| 13 | 17 | A |

EXAMPLE 14

The procedure of Example 1 was repeated to carry out polymerization, except that 400 g of 70% by weight di-2-ethylhexyl peroxydicarbonate solution in Shellsol 71 (tradename, Shell Chemical Co., Ltd.) as the polymerization initiator and 500 ml of Shellsol containing 0.2% by weight of hydroxyanisole as the cleaning fluid were used. After polymerization, the state of the sticking of polymer scale and the amount of the remaining solvent in the resulting polymer were evaluated in the same manner as in Example 1. The results are shown in Table 3.

EXAMPLES 15 AND 16

In Examples 15 and 16, a polymerization run was repeated 100 times and 1,000 times, respectively. In both examples, each polymerization run was carried out in the same manner as in Example 14. Thereafter, the state of the sticking of polymer scale and the amount of the remaining solvent in the resulting polymer were evaluated in the same manner as in Example 1. The results are shown in Table 3.

COMPARATIVE EXAMPLE 11

The procedure of Example 14 was repeated to carry out polymerization, except that 500 ml of Shellsol 71 containing no polymerization inhibitor was used as the cleaning fluid. After polymerization, the state of the sticking of polymer scale and the amount of the remaining solvent in the resulting polymer were evaluated in the same manner as in Example 1. The results are shown in Table 3.

COMPARATIVE EXAMPLES 12 AND 13

In comparative Examples 12 and 13, a polymerization run was repeated 100 times and 1,000 times, respectively. In both examples, each polymerization run was carried out in the same manner as in Comparative Example 11. Thereafter, the state of the sticking of polymer scale and the amount of the remaining solvent in the resulting polymer were evaluated in the same manner as in Example 1. The results are shown in Table 3.

EXAMPLE 17

The procedure of Example 14 was repeated to carry out polymerization, except that 500 ml of methanol solution containing 0.2% by weight of 2,2-di-(4'-hydroxyphenyl)propane was used as the cleaning fluid. After polymerization, the state of the sticking of polymer scale and the amount of the remaining solvent in the resulting polymer were evaluated in the same manner as in Example 1. The results are shown in Table 3.

EXAMPLE 18 AND 19

In Examples 18 and 19, a polymerization run was repeated 100 times and 1,000 times, repectively. In both Examples, each polymerization run was carried out in the same manner as in Example 17. Thereafter, the state of the sticking of polymer scale and the amount of the remaining solvent in the resulting polymer were evaluated in the same manner as in Example 1. The results are shown in Table 3.

TABLE 3

| | Number of polymerization run | Sticking of polymer scale | Amount of remaining organic solvent (ppm) |
| --- | --- | --- | --- |
| Example: | | | |
| 14 | 1 | A | 851 |
| 15 | 100 | A | 862 |
| 16 | 1,000 | A | 855 |
| 17 | 1 | A | 180 |
| 18 | 100 | A | 175 |
| 19 | 1,000 | B | 177 |
| Comparative Examples: | | | |
| 11 | 1 | A | 863 |
| 12 | 100 | C | 860 |
| 13 | 1,000 | C | 859 |

EXAMPLE 20 TO 24

In each Example, the procedure of Example 14 was repeated to carry out polymerization, except that, 500 ml of a solution containing 0.01% by weight (Example 20), 0.5% by weight (Example 21), 5% by weight (Example 22), 20% by weight (Example 23) or 40% by weight (Example 24) of di-t-butylhydroquinone in a mixed solvent of Shellsol 71 and ethanol (mix ratio: 9/1), was used as the cleaning fluid. After polymerization, the state of the sticking of polymer scale was evaluated in the same manner as in Example 1. The results are shown in Table 4. Incidentally, a lowering of polymerization rate was observed in Examples 20 and 21 as compared with Examples 17 to 19.

TABLE 4

| | Concentration of polymerization inhibitor | Sticking of polymer scale |
| --- | --- | --- |
| Example: | | |
| 20 | 0.01 | A |
| 21 | 0.5 | A |
| 22 | 5 | A |
| 23 | 20 | A |
| 24 | 40 | A |

EXAMPLES 25 TO 31, COMPARATIVE EXAMPLES 14 TO 21

In each example, the procedure of Example 1 was repeated to carry out polymerization, except that 560 g of an aqueous emulsion containing 50% by weight of di-2-ethylhexyl peroxydicarbonate as the polymerization initiator was charged into the polymerization vessel and washing was carried out under the conditions shown in Table 5. The solvent used for the cleaning fluid, the concentration of the polymerization inhibitor in the cleaning fluid and the amount of the cleaning fluid used were as shown in Table 5. After polymerization, the state of the sticking of polymer scale and the amount of the remaining solvent in the resulting polymer were evaluated in the same manner as in Example 1. The results are shown in Table 5.

vinyl chloride-soluble polymerization inhibitor in an organic solvent.

TABLE 5

| | Cleaning fluid | | | sticking state of scale | Amount of remaining solvent (ppm) |
|---|---|---|---|---|---|
| | Solvent | Polymerization inhibitor | Concentration of polymerization inhibitor (wt. %) | Amount of cleaning fluid (ml) | | |
| Example: | | | | | | |
| 25 | n-Hexane | 3-t-Butyl-4-hydroxyanisole | 0.1 | 500 | A | 10 |
| 26 | Methanol | Hydroquinone | 0.01 | 500 | A | 3 |
| 27 | Toluene | 3,5-Di-t-butyl-4-hydroxytoluene | 10 | 500 | A | 300 |
| 28 | Methyl ethyl ketone | 2,2'-di(4'-hydroxyphenyl) propane | 0.05 | 500 | A | 10 |
| 29 | Methyl ethyl ketone | 1,3-diphenyl-2-thiourea | 20 | 500 | A | 9 |
| 30 | Acetone | Triphenylphosphite | 50 | 500 | A | 13 |
| 31 | Benzene | Styrene | 0.001 | 1,000 | A | 450 |
| Comparative Example: | | | | | | |
| 14 | n-Hexane | — | — | 500 | B | 10 |
| 15 | Methanol | — | — | 500 | C | 1 |
| 16 | Toluene | — | — | 2,000 | B | 1,100 |
| 17 | Methyl ethyl ketone | — | — | 2,000 | B | 40 |
| 18 | Water | — | — | 500 | C | 0 |
| 19 | Acetone | — | — | 500 | B | 15 |
| 20 | Benzene | — | — | 1,000 | B | 500 |
| 21 | — | — | — | — | C | 0 |

EXAMPLES 32 TO 37

In each Example, the procedure of Example 25 was repeated to carry out polymerization, except that 200 ml of methyl ethyl ketone solution containing 0.0005% by weight, 0.01% by weight, 0.1% by weight, 1% by weight or 17% by weight of di-t-butylhydroquinone was used as the cleaning fluid, and the state of the sticking of polymer scale was evaluated in the same manner as in Example 1. Results obtained are shown in Table 6.

TABLE 6

| Example No. | Concentration of polymerization inhibitor in cleaning fluid (% by weight) | Sticking state of scale |
|---|---|---|
| 32 | 0.0005 | B |
| 33 | 0.01 | A |
| 34 | 0.1 | A |
| 35 | 1 | A |
| 36 | 10 | A |
| 37 | 17 | A |

We claim:

1. A process of preparing a vinyl chloride polymer in a polymerization vessel, comprising the steps of:
   charging an oil-soluble polymerization initiator through a charging passage communicating with the inside of a polymerization vessel in which vinyl chloride monomer is polymerized;
   polymerizing vinyl chloride or a vinyl monomer mixture containing vinyl chloride in an aqueous medium within said polymerization vessel; and,
   after charging said oil-soluble polymerization initiator into the polymerization vessel, washing the charging passage with a cleaning fluid containing a vinyl chloride-soluble polymerization inhibitor in an organic solvent.

2. The process according to claim 1, wherein said charging passage comprises a pipe communicating with the inside of the polymerization vessel.

3. The process according to claim 1, wherein said polymerization initiator is charged in the form of an aqueous emulsion.

4. The process according to claim 1, wherein said organic solvent comprises at least 50% by weight of an isoparaffin or toluene.

5. The process according to claim 1, wherein said cleaning fluid contains 0.001 to 90% by weight of the polymerization inhibitor.

6. The process according to claim 1, wherein said polymerization inhibitor is t-butylhydroxyanisole or di-t-butylhydroquinone.

7. The process according to claim 1, wherein said cleaning fluid has a temperature at which the polymerization initiator has a half-life period of 1 hour or less.

8. The process according to claim 4, wherein said organic solvent comprises not more than 50% by weight of the solvent selected from the group consisting of ethanol, isopropanol and methyl ethyl ketone.

9. The process according to claim 1, wherein said cleaning fluid is used in such an amount that the total amount of the polymerization inhibitor contained in the entire cleaning fluid used for washing may be 1% by weight or less based on the total amount of the monomer charged.

10. The process according to claim 1, wherein said cleaning fluid containing polymerization inhibitor is employed at a temperature ranging from −50° C. to the boiling point of the solvent.

* * * * *